United States Patent Office 2,959,582
Patented Nov. 8, 1960

2,959,582
AZODYESTUFFS SOLUBLE IN WATER

Kurt Schimmelschmidt and Helmut Kappenberger, both of Frankfurt am Main, Germany, assignors to Farbwerke Hoechst Aktiengesellschaft vormals Meister Lucius & Brüning, Frankfurt am Main, Germany, a corporation of Germany No Drawing. Filed July 22, 1958, Ser. No. 750,100

Claims priority, application Germany July 26, 1957

5 Claims. (Cl. 260—163)

The present invention relates to new azo-dyestuffs soluble in water and to a process for preparing the same; more particularly the invention relates to dyestuffs corresponding to the following general formula $$R_2\text{—}N\text{=}N\text{—}R_1\text{—}OPO(OH)_2$$

wherein $R_1$ represents a radical of the benzene, naphthalene or diphenyl series, $R_2$ represents the radical of a phenolic or enolic coupling component containing a hydroxyl group in a position adjacent to the azo-group, $R_1$ and $R_2$ being free from further solubilizing groups such as sulfonic acid, phosphonic acid or carboxylic acid groups.

We have found that valuable water-soluble azo-dyestuffs are obtained by coupling a diazotized aminoaryl-phosphoric acid ester with a coupling component capable of coupling in a position adjacent to a hydroxyl group, the diazo-component and the coupling component being free from further groups imparting solubility in water, such as sulfonic acid, phosphonic acid or carboxylic acid groups.

As aminoaryl-phosphoric acid esters there may be used the acid phosphoric acid esters of hydroxyarylamines, wherein aryl is intended to mean a radical of the benzene, naphthalene or diphenyl series, which may be substituted, for example by a halogen atom, an alkyl, alkoxy and/or nitro-group, such as:

2-, 3- or 4-aminophenyl-phosphoric acid ester,
2-methoxy-4-aminophenyl-phosphoric acid ester,
4-methoxy-2-aminophenyl-phosphoric acid ester,
2-chloro-5-aminophenyl-phosphoric acid ester,
2-chloro-4-aminophenyl-phosphoric acid ester,
4-chloro-2-aminophenyl-phosphoric acid ester,
2-bromo-4-aminophenyl-phosphoric acid ester,
2-nitro-4-aminophenyl-phosphoric acid ester,
2,5-dichloro-4-aminophenyl-phosphoric acid ester,
2-methyl-5-chloro-4-aminophenyl-phosphoric acid ester,
4-amino-1-naphthyl-phosphoric acid ester,
1-amino-2-naphthyl-phosphoric acid ester,
7-amino-2-naphthyl-phosphoric acid ester, or
4-amino-4'-diphenyl-phosphoric acid ester.

The aminoaryl-phosphoric acid esters can be prepared by known methods. They can also be prepared by hydrolysis and reduction of the nitroaryl-phosphoric acid chlorides obtainable by reacting aromatic phosphoric acid chlorides of the general formula

wherein X represents chlorine and at least one X represents the group Y—R, in which Y represents —O—, =NH or =N-alkyl and R represents a phenyl, naphthyl or diphenyl radical which may be substituted by a halogen atom, an alkyl and/or an alkoxy group, with a mixture of anhydrous nitric acid and sulfuric acid, and extracting from the reaction mixture the nitro-compounds so obtained with a low-boiling chlorinated hydrocarbon.

As coupling components capable of coupling in a position adjacent to a hydroxyl group there may be mentioned for example:

1-methyl-4-hydroxybenzene,
2-hydroxynaphthalene,
5,8-dichloro-1-hydroxynaphthalene,
1,3-dihydroxybenzene,
3-hydroxy-diphenyleneoxide,
2-hydroxycarbazole, and also the arylides of hydroxyaryl-carboxylic acids, such as 2,3-hydroxynaphthoylaminobenzene,
1-(2',3'-hydroxynaphthoylamino)-2-methoxybenzene,
1 - (2',3' - hydroxynaphthoylamino) - 2,4 - dimethoxy - 5-chlorobenzene,
1 - (2',3' - hydroxynaphthoylamino) - 2 - methyl - 4 - chlorobenzene,
1 - (2' - hydroxycarbazole - 3' - carboylamino) - 4 - chlorobenzene or
2-hydroxy-5-methyl-benzoylanilide.

There may also be used as coupling components the arylides of acylacetic acids, such as Acetoacetylaminobenzene,
1-acetoacetylamino-4-chloro-2,5-dimethoxybenzene,
2-acetoacetylamino-6-ethoxybenzothiazole,
1-benzoylacetylamino-2-methoxybenzene or
1-benzoylacetylamino-2,5-dimethoxybenzene, furthermore pyrazolone derivatives, such as 1-phenyl-3-methyl-5-pyrazolone,
1-(4'-nitrophenyl)-3-methyl-5-pyrazolone,
1-(3'-nitrophenyl)-3-methyl-5-pyrazolone,
1-(4'-chlorophenyl)-3-methyl-5-pyrazolone or
1-phenyl-3-carbethoxy-5-pyrazolone.

The coupling components are dissolved in alkali; to complete the dissolution of some difficultly soluble arylides of hydroxynaphthoic acid and hydroxycarbazole-carboxylic acid alcohol or acetone is added. The diazo-solution is run into the coupling solution while stirring well, and the formation of the dyestuff is completed in a neutral solution or in a solution rendered alkaline with sodium carbonate.

The water-soluble dyestuffs may be isolated by salting out. It is, however, suitable to acidify the coupled dyestuff solution. The dyestuff is obtained in the form of the acid ester which is insoluble and can be filtered well. The dyestuffs suspended in water can be obtained as water-soluble salts by dissolving them in caustitc alkalies, alkali metal carbonates, ammonia or organic bases and evaporating the solutions. The acid esters can also be converted into the water-soluble dyestuffs by grinding with an alkali metal carbonate.

The azo-dyestuffs obtainable by the present invention have the unexpected property of being absorbed by acetate silk from an aqueous solution, when the dyeing liquor is rendered weakly acid by slowly adding an acid, such as formic acid or acetic acid, during the dyeing process at about 85° C. There may also be added to the bath a readily hydrolyzable ester, for example tartaric acid diethylester or trimethylphosphate. The dyeings so produced are distinguished by good properties of fastness.

The azo-dyestuffs hitherto used in industry for dyeing acetate silk must be finely dispersed by means of a dispersing agent and dyed from an aqueous dispersion. In contrast therewith, the dyestuffs obtainable by this invention are soluble in water and need not be brought into a finely dispersed form with a dispersing agent. They represent, therefore, a considerable advance in the art.

The following examples serve to illustrate the invention, but they are not intended to limit it thereto, the parts being by weight unless otherwise stated, and the relationship of parts by weight to parts by volume being the same as that of the kilogram to the liter:

*Example 1*

18.9 parts of 3-aminophenyl-phosphoric acid ester are suspended in 100 parts by volume of water and mixed with 32 parts by volume of concentrated hydrochloric acid of 37.2% strength and ice. The compound is diazotized by introducing at 0° C. 13.5 parts by volume of a sodium nitrite solution of 40% strength under the surface of the mixture, until potassium-iodide-starch paper is turned blue.

21.9 parts of 1-(3'-nitrophenyl)-3-methyl-5-pyrazolone are dissolved in 100 parts by volume of water and 18 parts by volume of a sodium hydroxide solution of 33% strength, mixed with 200 parts by volume of a 10% sodium carbonate solution and a 10% sodium acetate solution, and the mixture is cooled to 0° C. to +5° C. The diazo-solution is rapidly added while stirring well. When the coupling is complete, the dyestuff formed is separated as water-soluble salt by the addition of a saturated solution of sodium chloride. The dyestuff can also be isolated by acidification; in this case it is precipitated as free acid which is insoluble in water and may be converted into the water-soluble form, for example by grinding with sodium carbonate.

The dyestuff corresponds to the following formula

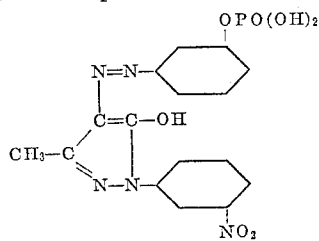

100 parts of acetate silk are treated for 2 hours at 85° C. with a solution of 2 parts of the sodium salt of the dyestuff dissolved in 4000 parts by volume of water and 5 parts of tartaric acid diethyl ester, the pH-value of the dyebath being 4–5 at the end of the dyeing operation. Acetate silk is dyed reddish yellow tints which are distinguished by good properties of fastness.

*Example 2*

22.4 parts of 2-chloro-4-aminophenyl-phosphoric acid ester are mixed with 150 parts by volume of water and 32 parts by volume of hydrochloric acid of 37.2% strength and diazotized at 0° C. with 13.5 parts by volume of a 40% sodium nitrite solution.

29.3 parts of 1-(2',3'-hydroxynaphthoylamino)-2-methoxy-benzene are dissolved in 18 parts by volume of a sodium hydroxide solution of 33% strength, 80 parts by volume of water and 5 parts by volume of acetone and cooled to +5° C. after the addition of 200 parts by volume of a 10% sodium carbonate solution and a 10% sodium acetate solution. The diazo-solution is added, while stirring well, and the dyestuff is separated, when the coupling is complete. It dyes acetate silk bluish red tints possessing good properties of fastness.

When 2-chloro-5-aminophenyl-phosphoric acid ester is used as diazo-component instead of 2-chloro-4-aminophenyl-phosphoric acid ester, a dyestuff is obtained which dyes acetate silk orange red tints.

The amino-2-chlorophenyl-phosphoric acid ester obtainable by nitration of 2-chlorophenyl-phosphoric acid dichloride, hydrolysis and reduction, yields, when diazotized and coupled with the above coupling component, a mixture of the two dyestuffs from 2-chloro-4-aminophenyl-phosphoric acid ester and 2-chloro-5-aminophenyl-phosphoric acid ester. This mixture dyes acetate silk red tints.

*Example 3*

18.9 parts of 4-aminophenyl-phosphoric acid ester are mixed with 100 parts by volume of water, 13.5 parts by volume of a sodium hydroxide solution of 33% strength and 13.8 parts by volume of a sodium nitrite solution of 40% strength and diazotized at 0° to 3° C. by introducing this mixture into 36 parts by volume of hydrochloric acid of 37.2% strength, 100 parts by volume of water and ice.

29.3 parts of 1-(2',3-hydroxynapthoylamino)-4-methoxybenzene are dissolved in 18 parts by volume of a sodium hydroxide solution of 33% strength, 85 parts by volume of water and 5 parts by volume of acetone, mixed with a solution of 18 parts of sodium acetate in 100 parts by volume of water, and the mixture is cooled to 0° to +5° C. After the addition of the diazo-solution a dyestuff is obtained which dyes acetate silk red tints of good properties of fastness.

*Example 4*

322 parts of amino-2-bromophenyl-phosphoric acid ester obtainable by nitrating 2-bromophenyl-phosphoric acid dichloride, hydrolysis and reduction, are mixed with 250 parts by volume of concentrated hydrochloric acid of 37.2% strength and ice and diazotized at 0° C. with 132 parts by volume of a 40% sodium nitrite solution.

293 parts of 1-(2',3'-hydroxynaphthoylamino)-2-methoxybenzene are dissolved in 330 parts by volume of a sodium hydroxide solution of 33% strength and water and mixed with an aqueous solution of 100 parts of sodium acetate in 100 parts by volume of water. The diazo-solution is rapidly run in at 0° to 5° C. A red dyestuff is obtained which is separated by acidification or salting out. It dyes acetate silk red tints.

The dyestuff corresponds to the following formula

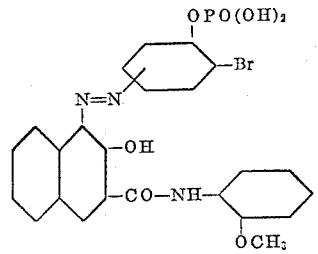

*Example 5*

22.4 parts of 2-chloro-5-aminophenyl-phosphoric acid ester are diazotized as described in Example 2 and introduced at 0°–5° C. into a solution of 27.2 parts of 1-aceto-acetylamino-2,5-dimethoxy-4-chlorobenzene in 18 parts by volume of a sodium hydroxide solution of 33% strength and 100 parts by volume of water, 200 parts by volume of a 10% sodium carbonate solution and a 10% sodium acetate solution. When the coupling is complete the dyestuff is separated. It dyes acetate silk greenish yellow tints possessing good properties of fastness.

*Example 6*

20.3 parts of 2-methyl-5-aminophenyl-phosphoric acid ester are diazotized as described in Example 1 and coupled with 35.7 parts of 1-(2',3'-hydroxynaphthoylamino)-5-chloro-2,4-dimethoxybenzene. The dyestuff so obtained dyes acetate silk bluish red tints of good properties of fastness.

The following table indicates a number of further azo-dyestuffs obtainable by this invention and the tints on acetate silk, which likewise possess good properties of fastness.

| | Diazo-component | coupling component | tint: |
|---|---|---|---|
| 1 | 3-aminophenyl-phosphoric acid ester. | 1-phenyl-3-methyl-5-pyrazolone. | reddish yellow. |
| 2 | ----do---- | 1-(4'-nitrophenyl)-3-methyl-5-pyrazolone. | Do. |
| 3 | 2-aminophenyl-phosphoric acid ester. | 1-(3'-chlorophenyl)-3-methyl-5-pyrazolone. | yellow. |
| 4 | 3-aminophenyl-phosphoric acid ester. | 1-(4'-methylphenyl)-3-methyl-5-pyrazolone. | Do. |
| 5 | ----do---- | 1-acetoacetylamino-2-methylbenzene. | greenish yellow. |
| 6 | ----do---- | 1-acetoacetylamino-2-methoxybenzene. | Do. |
| 7 | ----do---- | 1-acetoacetylamino-2,4-dimethylbenzene. | Do. |
| 8 | ----do---- | 1-acetoacetylamino-4-chloro-2,5-dimethoxybenzene. | Do. |
| 9 | ----do---- | 1-acetoacetylamino-4-carbethoxybenzene. | Do. |
| 10 | 4-aminophenyl-phosphoric acid ester. | acetoacetylaminobenzene. | Do. |
| 11 | 2-aminophenyl-phosphoric acid ester. | 1-acetoacetylamino-2,4-dimethoxybenzene. | Do. |
| 12 | 2-chloro-4-aminophenyl-phosphoric acid ester. | 1-(3'-nitrophenyl)-3-methyl-5-pyrazolone. | reddish yellow. |
| 13 | ----do---- | 1-acetoacetylamino-4-chloro-2,5-dimethoxybenzene. | yellow. |
| 14 | 2-chloro-5-aminophenyl-phosphoric acid ester. | 1-(2',3'-hydroxynaphthoylamino)-2-methoxybenzene. | red. |
| 15 | 2-aminophenyl-phosphoric acid ester. | ----do---- | Do. |
| 16 | 2-methoxy-4-aminophenyl-phosphoric acid ester. | 1-(3'-nitrophenyl)-3-methyl-5-pyrazolone. | brownish yellow. |
| 17 | ----do---- | 1-(2',3'-hydroxynaphthoylamino)-4-methoxybenzene. | bluish red. |
| 18 | ----do---- | 1-(2',3'-hydroxynaphthoylamino)-2,4-dimethoxy-5-chlorobenzene. | Do. |
| 19 | 4-amino-4'-diphenyl-phosphoric acid ester. | 1-(2',3'-hydroxynaphthoylamino)-2-methyl-4-chlorobenzene. | red. |
| 20 | 1-amino-7-naphthyl-phosphoric acid ester. | 1-(2',3'-hydroxynaphthoylamino)-naphthalene. | red violet. |
| 21 | ----do---- | 2-(2',3'-hydroxynaphthoylamino)-naphthalene. | Do. |
| 22 | 4-aminophenyl-phosphoric acid ester. | 2-hydroxy-5-methylbenzoylanilide. | brownish yellow. |
| 23 | ----do---- | 1-(2'-hydroxycarbazole-3'-carboylamino)-4-chlorobenzene. | brown. |
| 24 | 3-aminophenyl-phosphoric acid ester. | ----do---- | Do. |

We claim:
1. The azo-dyestuff soluble in water which corresponds to the following formula

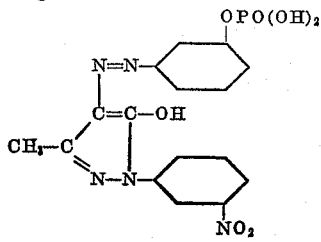

2. The azo-dyestuff soluble in water which corresponds to the following formula

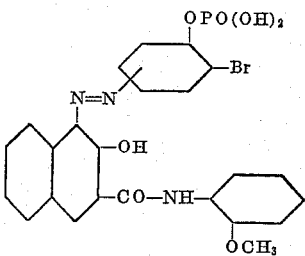

3. The azo-dyestuff soluble in water which corresponds to the following formula

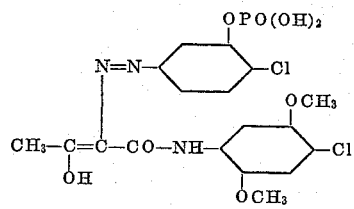

4. The azo-dyestuff soluble in water which corresponds to the following formula

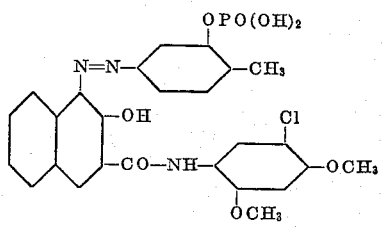

5. The azo-dyestuff soluble in water which corresponds to the following formula

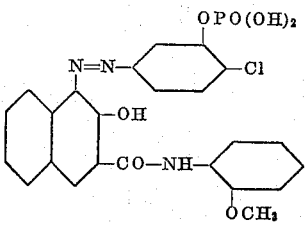

References Cited in the file of this patent
UNITED STATES PATENTS

| 2,195,390 | Ellis et al. | Mar. 26, 1940 |
| 2,251,921 | Dickey et al. | Aug. 12, 1941 |

FOREIGN PATENTS

| 785,457 | Great Britain | Oct. 30, 1957 |